March 19, 1957 L. E. FISHER 2,786,151
POWER DISTRIBUTION APPARATUS
Filed Oct. 4, 1954 3 Sheets-Sheet 1

INVENTOR.
Lawrence E. Fisher
BY Martin Kalikow
HIS ATTORNEY

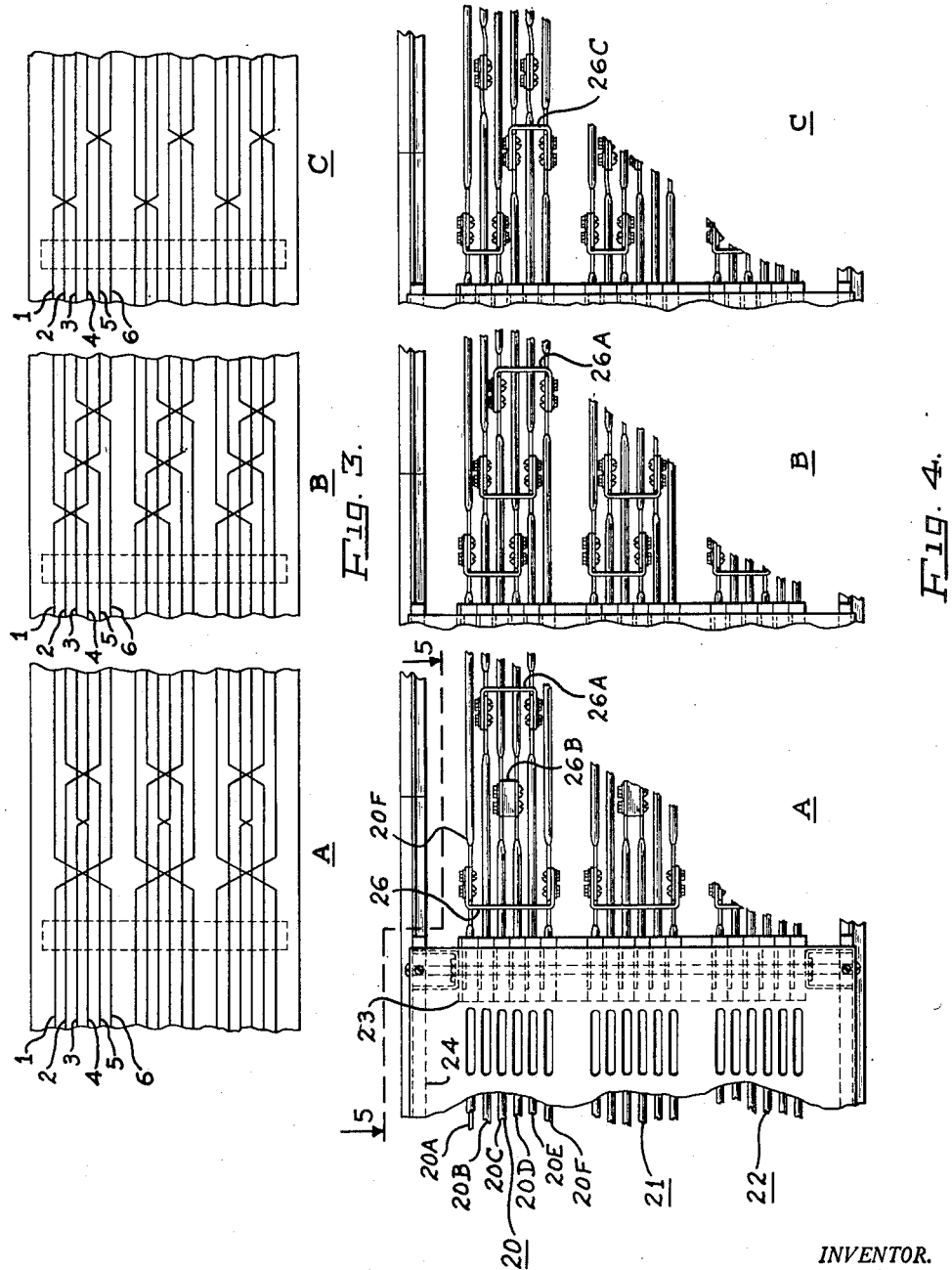

March 19, 1957  L. E. FISHER  2,786,151
POWER DISTRIBUTION APPARATUS
Filed Oct. 4, 1954  3 Sheets-Sheet 3

INVENTOR.
Lawrence E. Fisher
BY
Martin Kalikow
HIS ATTORNEY

United States Patent Office 2,786,151
Patented Mar. 19, 1957

2,786,151

POWER DISTRIBUTION APPARATUS

Lawrence Elbert Fisher, Southington, Conn., assignor to General Electric Company, a corporation of New York Application October 4, 1954, Serial No. 459,979

15 Claims. (Cl. 307—147)

My invention relates to electric power distribution apparatus and more particularly to busway systems capable of distributing multiphase and other out-of-phase power of unusually high current, for example, of the order of four-thousand amperes.

In large industrial plants and commercial buildings the ever-increasing use of electric power has brought about the need for bus duct systems having a rating of several thousand amperes. This increase in utilized power necessitates a corresponding increase in the available short-circuit current capacity in the power generating system. For example, short circuit current capacities of above 100,000 amperes are now becoming quite common. Circuit breakers, or other current interrupting means capable of normally carrying several thousand amperes and of interrupting short-circuit currents of above 100,000 amperes are not presently generally available and are both complicated and expensive.

Accordingly, an important object of the invention is to provide busway-type power distribution apparatus which inherently limits the short-circuit current delivered to the switchboard to predetermined values which can be handled by standard circuit protective devices.

In general, in accord with the invention, a multiphase electric power distribution apparatus is provided which is constructed to achieve high interphase reactance thereby serving inherently to limit the short-circuit current in the system. This is to be contrasted with conventional high power busway systems where every effort is normally made to minimize the interphase reactance, since it is often thought that low reactance is essential in order to prevent excessive heating and unequal distribution of current carried by bus bars of the same phase.

More specifically, in accord with the invention, busway apparatus is provided comprising a plurality of parallel spaced bus bar conductors supported within a suitable housing in groups of adjacent bus bars, each group for connection to a different phase of a multiphase or other out-of-phase system. The bus bars comprising each phase group are closely spaced while each phase group of bus bars are more widely spaced from one another; i. e., the intraphase spacing of the bus bars is less than the interphase spacing thereof, thereby to provide the desired high reactance in the busway system. In accord with another important feature of the invention, the bus bars within each phase group are supported in transposed relation in different locations along their length thereby to enforce equal intraphase current distribution despite the high reactance of the system. In accord with a further important feature of the invention the bus duct housing is made of a metal of low-magnetic permeability such as aluminum rather than steel or other ferromagnetic material in order to prevent excessive losses and heat due to eddy currents and other magnetic effects resulting from the magnetic flux.

The novel features believed characteristic of the invention are set forth in the appended claims. The invention itself, together with further objects and advantages thereof may be easily understood by referring to the following description taken in connection with the accompanying drawings in which:

Figures 3A, 3B and 3C are schematic diagrams of a number of typical intraphase transposition connections employed in the current limiting power distribution apparatus of the invention;

Figures 4A, 4B and 4C are plan views of bus duct constructions and transposition connections of the invention corresponding to the schematic diagrams of Figures 3A, 3B and 3C;

Figure 1:
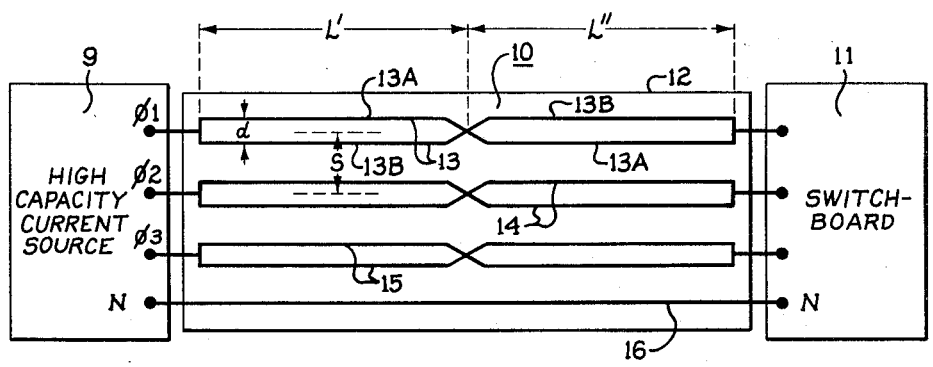
Figure 1 is a schematic diagram of a current limiting electric power distribution system incorporating the invention.
Figure 2:
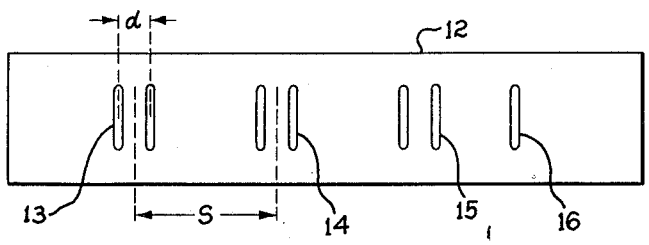
Figure 2 is a diagrammatic cross section of a bus duct of the invention illustrating certain important dimensions thereof.

Referring to Figures 1 and 2 the power distribution system embodying one form of the invention is shown schematically as comprising a high capacity source 9 of three-phase power which is delivered through a feeder-type bus duct apparatus 10 to a switchboard 11. Bus duct 10 comprises a housing 12 containing three groups 13, 14 and 15 of parallel spaced bus bar conductors, each group being connected to a respective one of the phases of the multiphase source 9. The bus duct 10 may also contain a neutral bus bar 16 connected to the neutral terminal of source 9. All of the bus bar conductors are preferably of rectangular cross section and arranged in flatwise alignment within housing 12.

The bus bar conductors of each phase group 13, 14 and 15 are arranged within housing 12 such that the interphase spacing S between conductors in each group are greater than the intraphase spacing $d$ among conductors of the same phase group. The ratio of the interphase to the intraphase spacing of the conductors is the major determinant of the reactance of the conductors. As is well known, the reactance may be fairly accurately determined from the expression:

$$x = 0.0529 \log \frac{D}{r}$$

where D is the mutual geometric mean distance between phases and is a function of interphase spacing S; and $r$ is the geometric mean radius of the single-phase group and is associated with the intraphase spacing $d$. More specifically, the mutual geometric mean distance D, between two areas is that distance which has a natural logarithm equal to the average of the natural logarithms of the distances from all points in one of the areas to all points in the other area; while the geometrical mean radius $r$, or self geometrical mean distance of an area is that distance whose natural logarithm is equal to the average of the natural logarithms of the distances of all points in the area from each other. In accord with the invention, the interphase spacing S is made greater, and preferably over two-times greater than the intraphase spacing $d$ in order to achieve the high reactance desired.

As shown in Figure 1, the bus bar conductors of each phase group 13, 14 and 15 are transposed within the phase grouping along their length at least once. These intraphase transpositions are preferably located such that equal lengths L' and L" of the bus bar conductors within one phase occupy identical relative positions. For example, referring to Figure 1, conductor 13A is transposed for one-half of its length to the position formerly occupied within housing 12 by conductor 13B and vice versa. In this way an approximately equal distribution of current is enforced among similar phase conductors 13A and 13B and the deleterious effect of the unequal magnetic fields threading these conductors as a result of the currents in the bus bars of other phases is minimized. Such intraphase transposition of the bus bars also minimizes proximity effects since different faces of the bus bars confront each other after the transposition than before.

Where busway 10 is employed to carry relatively high currents, for example, above one-thousand amperes, it is important that housing 12 be made of a non-magnetic or relatively low-magnetic permeability material, for example, aluminum. This is because the strong non-cancelled magnetic fields resultig from the high reactance arrangement of the bus bars within the housing generate eddy currents and other magnetic effects within a magnetic housing thereby usually producing intolerable heating as well as intolerable apparent resistance and consequent voltage drop within the conductors.

Referring now to Figures 3A, 3B and 3C a number of suitable intraphase transpositions are schematically illustrated in connection with a bus duct having three-phase groups of six bus bars each. In Figure 3A the transpositions are between conductors 1 and 6, 2 and 5, and 3 and 4; in Figure 3B between conductors 1 and 4, 2 and 5, and 3 and 6; and in Figure 3C between conductors 1 and 3, and 4 and 6, all within the same phase. In the transposition of Figure 3A all of the conductors of the same phase carry approximately the same current equivalent to the current normally carried by a single central conductor; in the transposition of Figure 3B the three pairs of transposed conductors carry slightly differing currents equivalent to that normally carried by three closely grouped conductors; while in the transposition of Figure 3C conductors 1 and 3 carry approximately the same current as normally carried by conductor 2 while conductors 4 and 6 carry approximately the same current normally carried by conductor 5.

Referring now to Figures 4 through 7, I have illustrated the actual construction of suitable intraphase transposition connections in bus duct apparatus of the general type described and claimed in Patent 2,468,614—Carlson, granted April 26, 1949, and Patent 2,576,774—Carlson, granted November 27, 1951. It will be appreciated that other general types of parallel bus bar constructions may equally be easily altered or modified to have the high reactance bus bar arrangement and intraphase transposition of the present invention. For example, the invention may be used with busway system of the construction disclosed in Patent 2,309,611—Harvey, granted January 26, 1943.

Figure 9:
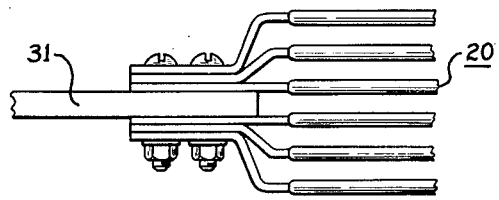
Figure 9 is a plan view of a terminal connection between the ends of bus bar conductors of the same phase current.
Figure 5:
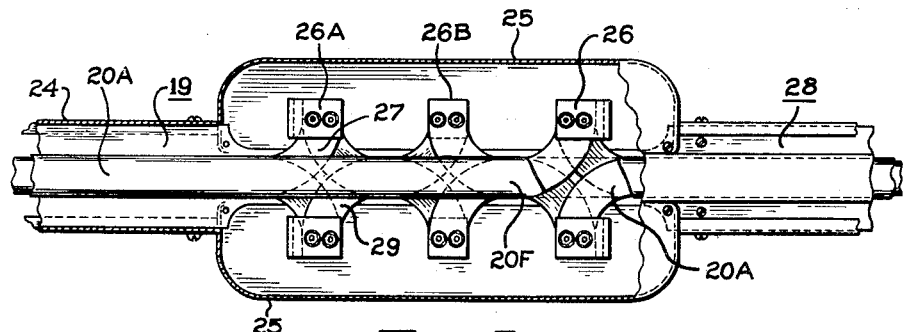
Figure 5 is a side view with a portion of the housing removed of the transposition connection of the bus duct apparatus illustrated in Figure 4A.
Figure 6:
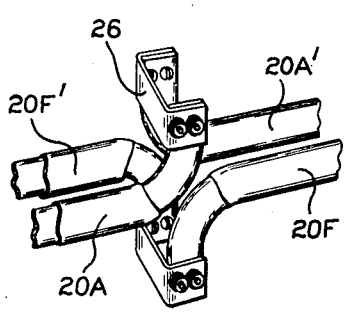
Figure 6 is a perspective view of one transposition connection of the apparatus of Figure 4A.
Figure 7:
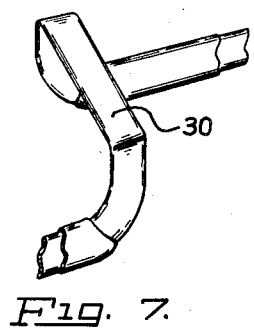
Figure 7 is an alternative transposition connection.

Figures 4A, 4B and 4C correspond respectively to the schematic intraphase transpositions illustrated in Figures 3A, 3B and 3C. Figure 5 is a side view of bus duct transposition connection of Figure 4A. In these figures three-phase groups 20, 21 and 22 of parallel spaced flat bus bar conductors are supported by suitable insulating means 23 within an aluminum housing 24. The detailed construction of insulating means 23 is disclosed and claimed in Patent 2,576,774—Carlson. Housing 24 is rectangular in cross section and surrounds the bus bars along their entire length with the exception of the extremities of the bus bar sections 19, 28 which are made available for interconnection through suitable removable covers 25 illustrated in Figure 5. The end portions of the bus bars of each section are bent edgewise from the general plane of the bars to facilitate interconnection with the bus bars of adjacent sections comprising the bus duct system. Where the bus duct sections are to be interconnected without transposition of the conductors, the ends of all of the conductors may be bent edgewise in the same direction, for example, downward and interconnected in a manner identical with that shown in Patent 2,648,614. At those locations along the bus duct run where intraphase transpositions in accord with the invention are desired, the ends of the conductors extending the same plane and direction are bent edgewise in opposite directions such that they do not meet but rather are available for transposed interconnection by laterally extending jumpers 26 to other parallel bus bars extending in laterally spaced positions. In Figures 4A, 5 and 6, for example, conductor 20A has its end 27 bent edgewise upward while conductor 20F of adjacent section 28 has its end 29 bent downward such that transposed connections through jumpers 26 may be made to laterally position bus bar conductors 20A' and 20F', respectively. Similar transposition connections at longitudinally staggered positions may be made between conductors 20B through 20E of sections 19 and 28, respectively. Instead of a disconnectable connection as illustrated in Figures 4, 5 and 6 an integral jumper transposition connection may be made by merely bending the bars edgewise and then transversely to form a bridge-type transposition 30 as illustrated in Figure 7. Other suitable jumper connections 26A, 26B and 26C are illustrated in Figures 4A, 4B and 4C for use in transposition between bus bars of lesser lateral spacing. It will be appreciated that all of the bus bars of each phase group 20, 21 and 22 are shorted together at both the current source and at the switchboard end of the power distribution system by any suitable means such as by a similar jumper which makes connection to each of the bus bars of the phase group. Alternatively, the shorted connection at the input and output end of the bus duct apparatus may be made to a common bar conductor 31 connected to laterally-bent ends of the bus bars as illustrated in Figure 9.

Figure 8:
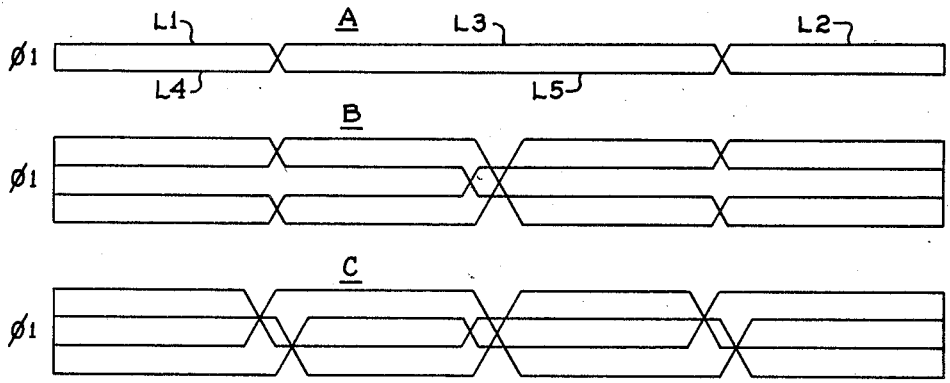
Figures 8A, 8B and 8C are a group of schematic diagrams of typical multiple intraphase transpositions preferably employed on unusually long feeder busways embodying the invention.

Referring now to Figures 8A, 8B and 8C, I have illustrated schematically some intraphase transpositions preferably used on two-wire and four-wire single-phase groupings of multiphase systems preferably used where the length of the bus duct apparatus is fairly great, for example, above 100 feet. In each of these diagrammatic representations the actual length of the bus bar conductors between the transpositions is, of course, much greater than that indicated by the proportions of the schematic representation. In each of the diagrams only one-phase grouping is shown since the remaining phase groupings of the multiphase system would normally be identical. In Figure 8A there is illustrated a two-wire phase group with two spaced intraphase transpositions along the length of the entire duct. In Figures 8B and 8C there are illustrated four-wire phase groups with alternative arrangements of three intraphase transpositions along the entire length of the bus duct apparatus. In each of the diagrams it is important to note that the total length of any one conductor subsisting in each of the transposed positions is equal. Moreover, equal lengths of each conductor are transposed. For example, in Diagram 8A, L1 plus L2 is equal to L3, while L4 is equal to L1, and L5 equal to L3. It is also important to note that in the preferred multiple intraphase transpositions of Figures 8B and 8C, that transpositions are made not only between adjacent outer or adjacent inner conductors, but also from inner to outer conductors such that each conductor occupies the same relative position as every other conductor for equivalent lengths throughout the overall length of the duct. In this way maximum equality in the distribution of current among the bus bars of a single-phase is maintained. Practically, however, it may be necessary to transpose only a few of the bars.

Typical dimensions and spacing for a three-thousand ampere, 480 volt, three-phase, 18 bar, current limiting busway constructed as illustrated in Figures 4A and 5 are as follows:

Length of run—40 ft.
Bus bar cross section—¼" x 2"
Number of bars per phase—6
Intraphase spacing (d)—¾"
Interphase spacing (S center to center in adjacent phase groups)—4½"
Housing cross section—5⅛" x 29½"

The resulting electrical characteristics of bus duct apparatus constructed in accord with these dimensions as measured from line to neutral are approximately as follows:

OHMS FOR 40 FEET LINE TO NEUTRAL

*60 cycle alternating current*

| Resistance | Reactance | Impedance |
|---|---|---|
| .00030 | .00184 | .00186 |

Busway with these electrical characteristics may be typically applied where the effective impedance of the primary system of the transformer bank is, for example, 0.00173 ohm thereby presenting an available R. M. S. asymmetrical short-circuit current at the secondary of the transformer of about 200,000 amperes. With this 40-foot busway, the total impedance to the switchboard would be 0.00173 ohm in the transformer primary system plus 0.00186 ohm in the busway thereby limiting the available short-circuit current to about 96,000 amperes so that a standard 100,000 ampere interrupting capacity circuit breaker can properly be applied. Moreover, the resistance of this busway is only slightly higher than the resistance of the conventional low reactance type non-current limiting busway system of corresponding rating, such that there is still negligible power loss in the power distribution system and the operating temperature is satisfactory.

Although I have described the above specific embodiments of the invention, many modifications can be made and I intend by the appended claims to cover all such modifications as fall within the true scope and spirit of the invention.

What I claim as new and desire to secure by Letters Patent of the United States is:

1. In an electric power distribution apparatus, a plurality of parallel spaced bus bar conductors supported in groups of adjacent conductors each group for connection to a different phase of out-of-phase electric power sources with the interphase spacing of said conductors being greater than the intraphase spacing thereof, said conductors having intraphase transpositions along their length.

2. Current limiting electric power distribution apparatus comprising a hollow elongated housing of low magnetic permeability, and a plurality of parallel spaced bus bar conductors supported within said housing in groups of adjacent conductors each group for connection to a different phase of out-of-phase electric power sources, the interphase spacing of said conductors being more than twice the intraphase spacing thereof.

3. The current limiting power distribution apparatus of claim 2 wherein the housing comprises aluminum.

4. The current limiting power distribution apparatus of claim 2 wherein at least one pair of conductors in each phase group have parallel portions along their length connected in mutual transposed relation.

5. In electric power distribution apparatus, a plurality of parallel spaced side-by-side bus bar conductors supported in groups of adjacent similar phase conductors with the spacing between adjacent conductors within each group substantially less than the spacing between central conductors of different adjacent groups, means short circuiting the adjacent ends of conductors within each group, and means connecting parallel portions of at least one pair of conductors within each group in mutual transposed relation along their length.

6. A high reactance busway for limiting the short-circuit current delivered from a high capacity multiphase power source to electricity utilization equipment comprising a hollow elongated metal housing of low magnetic permeability, a plurality of parallel spaced side-by-side bus bar conductors supported within said housing in groups of adjacent conductors with the spacing between adjacent conductors in each group several times less than the spacing between central conductors of the different adjacent groups, means for connecting all conductors of each group to a different phase of the multiphase source, and means connecting parallel portions of at least one pair of conductors within each phase group in mutual transposed relation along their length.

7. Short-circuit current limiting power distribution apparatus comprising a hollow elongated housing, a plurality of parallel spaced bus bar conductors supported within said housing in groups of adjacent conductors each group for connection to a different phase of out-of-phase electric power, the spacing between centrally located conductors of different adjacent groups being at least twice the spacing between adjacent conductors within the same phase group thereby to provide relatively high reactance, and at least the outermost conductors of each phase group having portions in mutual transposed relation along their length.

8. Short-circuit current limiting power distribution apparatus comprising a hollow elongated housing, a plurality of parallel spaced bus bar conductors supported within said housing in groups of adjacent conductors each group for connection to a different phase of out-of-phase electric power sources, the spacing between centrally located conductors of different adjacent groups being several times greater than the spacing between adjacent conductors within the same phase group thereby to provide relatively high reactance and at least one pair of conductors within each group having parallel portions in mutual transposed positions along their length with the total length of the portions of each conductor in each transposition being substantially equal.

9. In electric power distribution apparatus, a plurality of parallel spaced bus bar conductors supported in groups of adjacent conductors each group for connection to a different phase of out-of-phase power sources with the interphase spacing of said conductors being greater than the intraphase spacing thereof, said conductors having intraphase transpositions along their length both between the two outermost conductors and between the inner and outer conductors of the same phase groups.

10. In electric power distribution apparatus, at least two bus duct sections each comprising a plurality of parallel spaced side-by-side bus bars supported in groups of adjacent bars each group for connection to a different phase of out-of-phase power sources and laterally extending means connecting the ends of at least one pair of bus bars within each phase group of one section to the ends of a correspondingly positioned pair of bus bars of the other section thereby to provide intraphase transpositions of said interconnected bus bars along the length of said apparatus.

11. In a bus bar system of electric power distribution, a plurality of interconnected bus bar sections, each section comprising a group of flat bus bars extending in parallel spaced mutually flatwise relation, the connections between at least one pair of sections being offset from the general plane of the bus bars and comprising conductors extending transversely of the direction of the bus bars between the ends of bus bars in one section of said pair and the adjacent ends of laterally positioned bus bars in the other section thereby to provide a transposition of the bus bars by exposed connections accessible from the sides.

12. In a bus bar system of electric power distribution, a plurality of flat bus bar conductors extending in parallel spaced mutually flatwise relation, at least one pair of said conductors each having two longitudinal portions joined together by a transverse portion, the transverse portions of said conductors extending in planes offset from and on opposite sides of the general plane of said bus bars and crossing one another to provide transposition of said pair of conductors.

13. In the bus bar system of claim 12, a pair of transposed conductors wherein the transverse portions are integral with the longitudinal portions thereof.

14. In the bus bar system of claim 12, a pair of transposed conductors wherein the transverse portions comprise bridging conductors connected at each end to the longitudinal portions of said bus bar conductors.

15. In a bus bar system of electric power distribution, two interconnected bus bar sections each comprising a group of parallel spaced flatwise bus bars arranged in the same general plane with each bar in longitudinal alignment with one of the bus bars of the other section to form at least first and second pairs of said longitudinally aligned bus bars each pair having adjacent end portions bent edgewise in opposite directions from the general plane of said bus bars and in reverse relation to the other pair, and a pair of transverse conductors each connecting the end portions of said bars projecting on the same side of said plane thereby to transpose said bus bars.

References Cited in the file of this patent

UNITED STATES PATENTS

| | | |
|---|---|---|
| 2,247,133 | Rees | June 24, 1941 |
| 2,297,170 | Rudd | Sept. 29, 1942 |
| 2,365,514 | Bosch | Dec. 19, 1944 |